UNITED STATES PATENT OFFICE.

ADOLPH SCHRÖDER, OF HOBOKEN, NEW JERSEY, ASSIGNOR TO ALFRED KRAUSE, OF BERLIN, GERMANY.

PROCESS OF MAKING SANITARY CARBONATED ICE.

No. 850,607.  Specification of Letters Patent.  Patented April 16, 1907.

Application filed November 5, 1904. Serial No. 231,536.

*To all whom it may concern:*

Be it known that I, ADOLPH SCHRÖDER, a subject of the German Emperor, and a resident of Hoboken, in the county of Hudson and State of New Jersey, have invented certain new and useful Improvements in Processes of Making Sanitary Carbonated Ice, of which the following is a specification.

This invention has reference to a novel process of producing sanitary carbonated ice made from sterilized and carbonated water. In addition thereto flavoring extracts, fruit esters, medicinal or nutritious substances may be added to the water at a certain stage of the process before freezing, whereby a wholesome, nutritious, or medicinal product is obtained.

When sterilized and carbonated ice with or without the addition of flavors nutritious or medicinal substances is allowed to melt by itself or during cooling a liquid, then the resulting liquid is sparkling, improving thus the taste and quality of same.

In carrying out my invention I substantially proceed as follows: The water to be employed must be clear, but may contain bacteria. Should the water be turbid or contain foreign matter, then same must be filtered before use. The clear or filtered water is now treated with solid peroxids whose products of decomposition are not detrimental to health—for instance, peroxid of magnesium or calcium. The solid peroxid is added in form of fine powder, and while adding it the water is constantly stirred, mechanically or otherwise, until the peroxid has been completely dissolved. Now the water is saturated with pure carbonic-acid gas. This operation is preferably carried out in closed vessels, so that no carbonic-acid gas is lost by leakage or relatively slow absorption.

The carbonic-acid gas is conducted into the liquid at the beginning of the process at normal temperature—say at from 16° to 20° centigrade. This is done for the purpose of dissolving the finely-divided peroxids, which form with the carbonic-acid gas bicarbonates, and facilitates a quicker sterilization of the water, as will be fully described further down. When the peroxids have been completely transformed by the carbonic-acid gas, the temperature of the now sterilized water is reduced to near the freezing-point, while the saturation of the water with gas is continued. At the temperature of 1° to 0° centigrade and at normal pressure of seven hundred and sixty millimeters one volume of water will contain 1.79 volumes of carbonic-acid gas when completely impregnated therewith. The water thus prepared is now allowed to freeze by the application of cold in any suitable manner, and thus transformed into ice.

If it is desired to introduce additional substances, as above-mentioned, then same are added before the water is sterilized and carbonated. Such substances are, for instance, organic acids, such as citric acid, small quantities of volatile oils, or flavoring extracts. In certain cases nutritious substances—for instance, milk or sugar—may be added and sometimes medicinal substances, such as phosphates and the like. These additions improve the water as to taste and quality, adding to the hygienic properties such which make the product a wholesome and nutritious one.

The relative proportions employed in my invention are stated in the following examples:

First. To one hundred liters of clear water I add one hundred grams of finely-powdered peroxid of magnesium, which contains about twenty-eight to thirty per cent. of pure peroxid. Now pure carbonic-acid gas is introduced at a temperature of from 16° to 20° centigrade while constantly agitating the liquid. Toward the end of this operation the temperature is reduced to from 1° to 0° centigrade and the introduction of gas continued until all the solid peroxid has been dissolved by the carbonic-acid gas, and the water is saturated therewith at this low temperature. The one hundred liters will then absorb about five hundred and ten grams of carbonic-acid gas. The water thus treated is now allowed to freeze by the application of cold, which is applied in any convenient manner.

Second. To one hundred liters of clear water I add fifty grams of peroxid of calcium, which contains about seventy-two per cent. of pure peroxid. This mixture will absorb about four hundred and seventy-four grams of carbonic-acid gas when same is introduced under the above-described conditions. The water thus treated is then frozen.

Third. Fifty liters of clear water and fifty liters of milk are mixed. Then fifty grams of peroxid of calcium are added, which contains about seventy-two per cent. of pure peroxid. When treated as above described, this mixture will likewise absorb about four hundred and seventy-four grams of carbonic-acid gas. The water thus prepared is then frozen.

In order to more fully explain the process, it may be stated here that the peroxids of magnesium and calcium are decomposed by the action of the carbonic-acid gas. Hereby active oxygen is evolved, which, acting in *statu nacenti*, destroys by oxidation all organic germs, particularly nitrogen-bearing germs and bacteria. After the bacteria have been destroyed, and not before, begins the formation of peroxid of hydrogen in the water. At the same time bicarbonates are formed from the bases of the peroxids, such as bicarbonate of calcium,

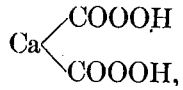

or bicarbonate of magnesium,

All these bicarbonates are easily soluble in water which contains carbonic-acid gas.

For the above reason the liquid peroxid of hydrogen on which the carbonic-acid gas does not act is less effective as a sterilizing agent than the solid peroxids of magnesium or calcium.

In the described manner I have produced sanitary ice free from bacteria and carbonated, which may contain flavoring extracts, nutritious and medicinal substances. Hereby a sparkling, wholesome, nutritious, or medicinal product is obtained.

Having thus described my invention, I claim as new and desire to secure by Letters Patent—

1. The process of producing artificial sanitary ice consisting in freeing clear water from bacteria by adding peroxid of magnesium, introducing pure carbonic-acid gas, reducing the temperature to near the freezing-point, saturating the water while under normal pressure with carbonic-acid gas at this temperature and freezing said water.

2. The process of producing artificial sanitary ice consisting in freeing clear water from bacteria by adding peroxids of the earth alkali metals, introducing into the water while under normal pressure pure carbonic-acid gas whereby the peroxids are transformed into soluble bicarbonates and nascent oxygen is evolved until all bacteria are destroyed, reducing the temperature of the water thus treated to near the freezing-point and continuing to saturate while under normal pressure with carbonic-acid gas at this temperature, and freezing said water.

Signed at New York, N. Y., this 2d day of November, 1904.

ADOLPH SCHRÖDER.

Witnesses:
   LUDWIG K. BÖHM,
   ALFRED KRAUSE.